May 1, 1956 E. W. HAWKINSON 2,743,481
TIRE RETREADING APPARATUS
Filed Dec. 27, 1954 2 Sheets-Sheet 2
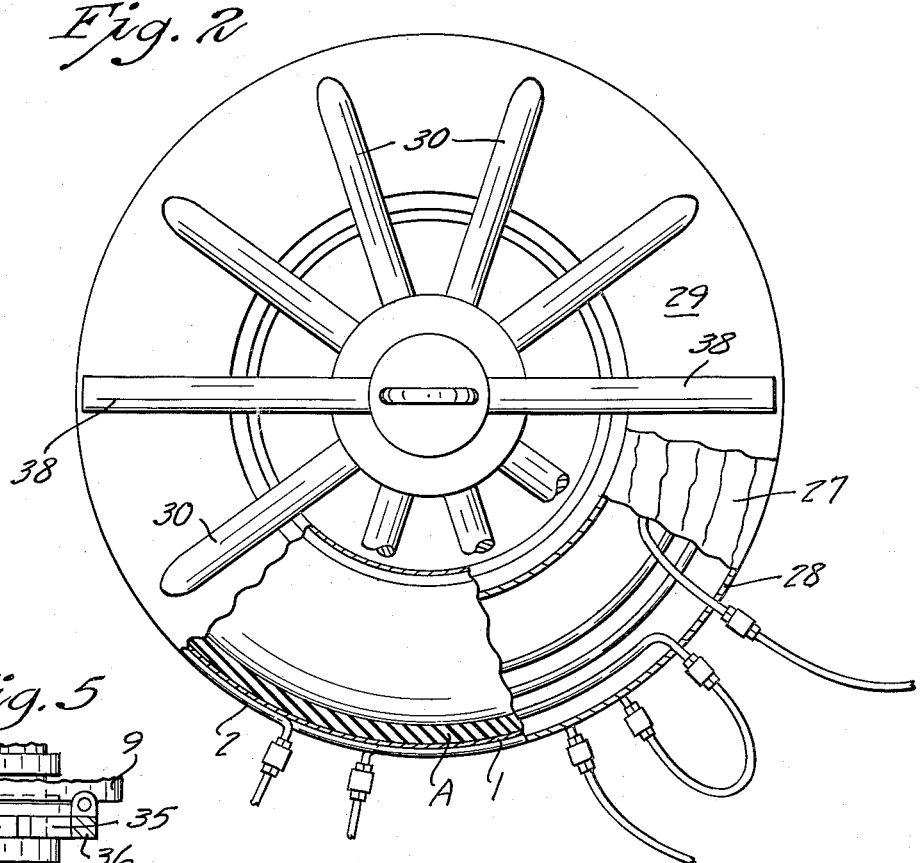
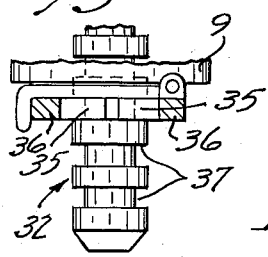
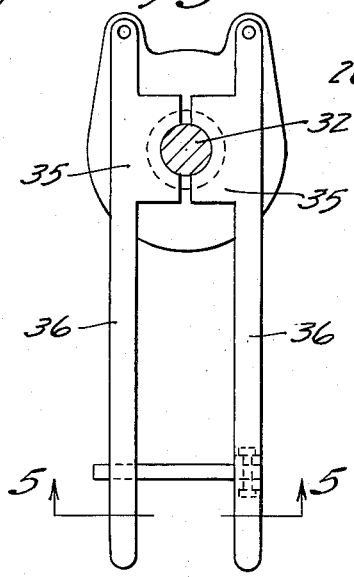
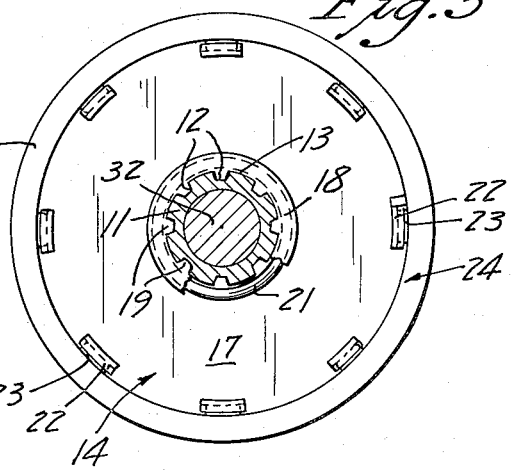
INVENTOR.
Earle W. Hawkinson
BY
Merchant & Merchant
ATTORNEYS United States Patent Office 2,743,481
Patented May 1, 1956

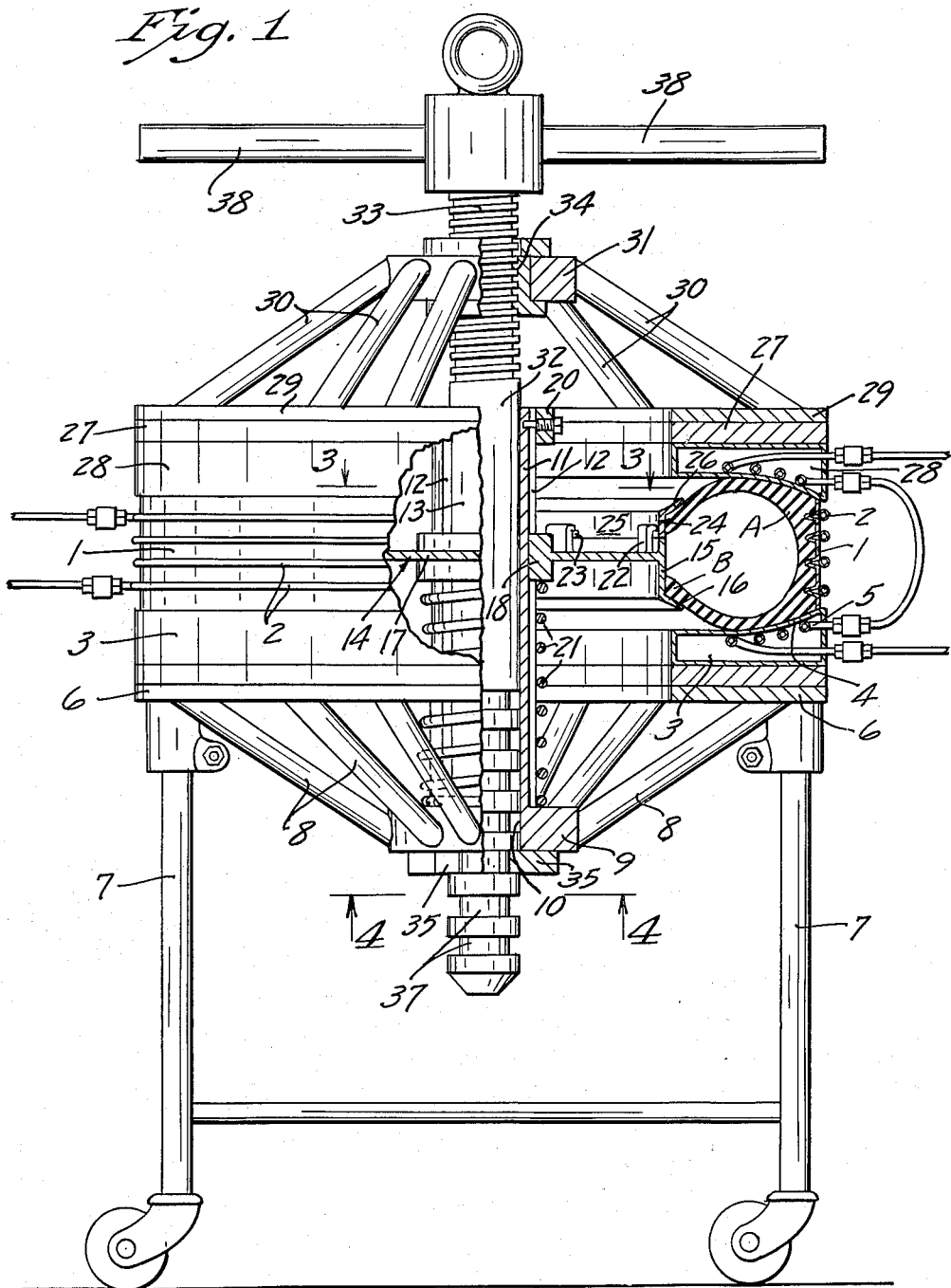

2,743,481

TIRE RETREADING APPARATUS

Earle W. Hawkinson, Minneapolis, Minn., assignor to Paul E. Hawkinson Company, Minneapolis, Minn., a corporation of Minnesota Application December 27, 1954, Serial No. 477,631

4 Claims. (Cl. 18—18)

My invention relates to tire retreading apparatus, and, more particularly, to improvements, in devices of the type disclosed in my co-pending application, S. N. 377,498, filed August 31, 1953, and entitled "Tire Retreading Equipment."

In the operation of devices of the type immediately above described, I have encountered considerable difficulty in applying the rim sections to the bead portions of the pneumatic tire casing being treated. This is primarily due to the fact that the horizontally disposed mold sections are vertically slidable upon an axial guide sleeve. Therefore, in order to apply the upper rim section to the lower rim section, it is necessary to elevate the latter to a point where the former can be applied, by rotation, thereto without undue friction of the flange of the former upon the bead of the tire casing. Such an operation requires one man to elevate the lower rim section and one to rotate the upper rim section. On the other hand, when one desires to remove the upper rim section from the lower one thereof, the combined weight of the two sections is brought to bear upon the upper bead of the tire casing through the rim flange of the upper section. Therefore, it is again necessary to elevate the lower rim section sufficiently to relieve this frictional engagement sufficiently to permit rotation of the upper rim section.

The primary object of my invention is the provision of novel means for constantly urging the lower rim section upwardly toward a centering relationship with respect to the tire casing whereby to reduce, if not eliminate, frictional engagement between the rim flange of the upper rim section and the adjacent bead portion of the tire casing—whereby to greatly facilitate locking the upper and lower rim sections together upon the tire casing, and removing said sections therefrom.

The above and still further objects of my invention will become apparent from the following detailed specification, appended claims and attached drawings.

Referring to the drawings, wherein like characters indicate like parts throughout the several views:

Fig. 1 is a view partly in side elevation and partly in vertical axial section.

Fig. 2 is a view in top plan, some parts being broken away and some parts being shown in section.

Fig. 3 is a view partly in horizontal section and partly in top plan as seen substantially from the line 3—3 of Fig. 1.

Fig. 4 is a view partly in section and partly in bottom plan taken substantially on the line 4—4 of Fig. 1, and Fig. 5 is a fragmentary view partly in side elevation and partly in section taken on the line 5—5 of Fig. 4.

Referring with greater particularity to the drawings, the numeral 1 indicates an endless cylinder-like matrix preferably formed from sheet metal and heated by means of a tubular steam conduit 2 wound spirally thereabout and secured thereto by means of solder or the like. Matrices of this general character and the method of forming same are disclosed in Patent Re. 21,956.

Matrix 1 is of less diameter than the normal diameter of a tire casing A to be retreaded therein and the tire A is entered thereinto and removed therefrom by spreading the beads B laterally at circumferentially spaced points, all as clearly taught in Patent Re. 21,956.

For curing the newly applied tread rubber to the tire casing A, said tire A with matrix 1 applied thereto is placed upon the lower table-acting annular mold section 3, which, as shown, includes an annular metal jacket 4 having steam coil 5 wound spirally thereabout, an annular mounting plate 6 supported by legs 7, downwardly and radially inwardly extending spiderlike arms 8, and a head 9 having an axial opening 10 therethrough. Rigidly secured to the head 8 and projecting upwardly therefrom concentric with the opening 10, is a guide sleeve 11 having a plurality of circumferentially spaced axial grooves 12 in its outer surface 13.

The lower rim section 14 comprises a cylindrical felly band 15, a bead engaging flange 16, an annular mounting flange 17, and a collar 18 vertically slidably mounted on the external surface 13 and having a plurality of circumferentially spaced splines 19 which are received within the grooves 12 of the guide sleeve 11, whereby to prevent rotation of said rim section 14 while permitting vertical sliding movements thereof, see particularly Figs. 1 and 3. A removable stop collar 20 limits upward sliding movements of the lower rim section 14 on said guide sleeve 11.

A coil compression spring 21 is interposed between the head 9 and the collar 18 of the rim section 14, and is of a length to bias the rim section 14 toward a centering relationship with respect to the tire casing A, with the bead flange 16 thereof in engagement with the lower bead B.

Lower rim section 14, as shown, is provided with upwardly projecting circumferentially spaced locking hooks 22 which are adapted to engage the circumferentially spaced cam-acting locking lugs 23 on the upper rim section 24. Upper rim section 24 also includes a cylindrical felly band 25 and a bead engaging flange 26. Locking engagement between the lower and upper rim sections 14, 24 is accomplished by rotation of the latter with respect to the former to cause frictional engagement between the locking hooks 22 and the lugs 23. Because the coil spring 21 constantly holds the lower rim 14 in the tire-centered position of Fig. 1, a minimum of friction between the bead flange 26 of the upper rim section 24 is created, and hence rotation of the latter with respect to the former is extremely easy.

Opposing the lower mold section 3 is a matching upper mold section 27 which includes a metal jacket 28, an annular pressure plate 29, upwardly and inwardly radiating spider arms 30, and an annular head 31. Clamping screw 32 is slidably received within the guide sleeve 11 and has its upper threaded end 33 in engagement with the internal threads 34 in the head 31. The lower end of the clamping screw 32 projects through the axial opening 10 in the head 9 and is selectively locked in operating position through the medium of clamping jaws 35 on the horizontally pivoted arms 36, shown particularly in Figs. 4 and 5, the jaws 35 are of a transverse thickness to be received within vertically spaced annular channels 37 in the lower end portion of the screw 32. Also preferably, and as shown, the screw 32 is provided at its upper end with a radially projecting handle 38, which facilitates the application of clamping pressure upon the opposed mold sections 3, 28.

My invention has been thoroughly tested and found to be completely satisfactory for the accomplishment of the above objects; and while I have shown a preferred embodiment thereof, it should be understood that same is capable of modification without departure from the scope of the appended claims.

What I claim is:

1. In a device of the class described, a pair of opposed circular horizontally disposed mold sections, the lower of said sections comprising a table for the reception of a tire to be treated between said sections, a guide sleeve extending axially upwardly from said table, a screw element extending axially through said sleeve and having screw threaded engagement with one of said mold sections, means for locking said screw element against axial movement with respect to the other of said mold sections, a curing rim comprising a pair of upper and lower detachable rim sections, the lower of said rim sections having a central hub axially slidably mounted on said sleeve, means locking said lower rim section against rotation on said guide sleeve and yielding means interposed between said table and said lower rim section biasing said rim section in a direction axially away from said lower mold section.

2. The structure defined in claim 1 in further combination with means limiting vertical movements of said lower rim section on said guide sleeve.

3. The structure defined in claim 1 in which said yielding means comprises a coil compression spring encompassing said guide sleeve.

4. In a device of the class described, a pair of opposed circular horizontally disposed mold sections, the lower of said sections comprising a table for the reception of a tire to be treated between said sections, a guide sleeve extending axially upwardly from said table, a clamping element extending axially through the said sleeve and having adjustable engagement with one of said mold sections, means for locking said clamping element against axial movement with respect to the other of said mold sections, a curing rim comprising a pair of upper and lower detachable rim sections, the lower of said rim sections having a central hub axially slidably mounted on said sleeve, means locking said lower rim section against rotation on said guide sleeve, and yielding means interposed between said table and said lower rim section biasing said rim section in a direction axially away from said lower mold section.

References Cited in the file of this patent

UNITED STATES PATENTS

| | | |
|---|---|---|
| 2,429,786 | Wright | Oct. 28, 1947 |
| 2,712,156 | Potter et al. | July 5, 1955 |